G. B. REID.
SHOCK ABSORBER.
APPLICATION FILED JAN. 6, 1919.
1,326,288.
Patented Dec. 30, 1919.
2 SHEETS—SHEET 1.
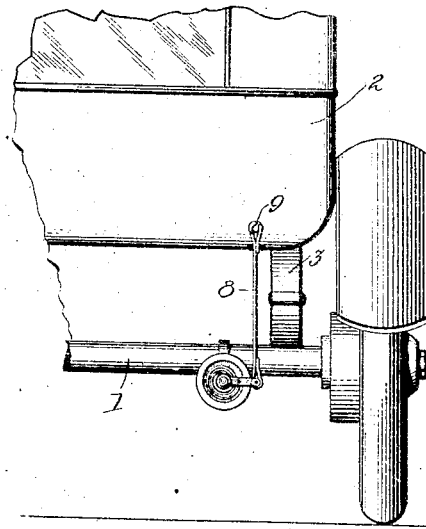
Fig. 1.
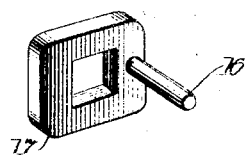
Fig. 5.
Fig. 3.
Fig. 2.
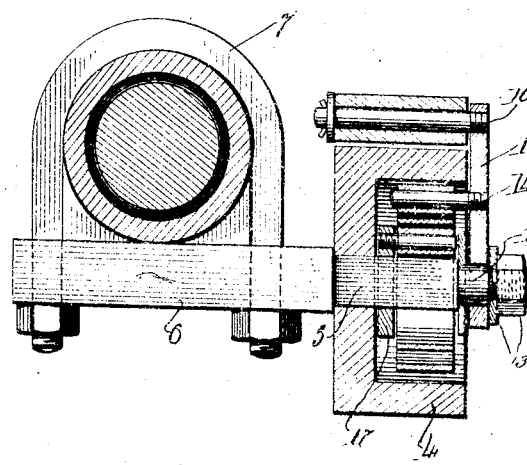
Fig. 4.
Inventor.
G. B. Reid.

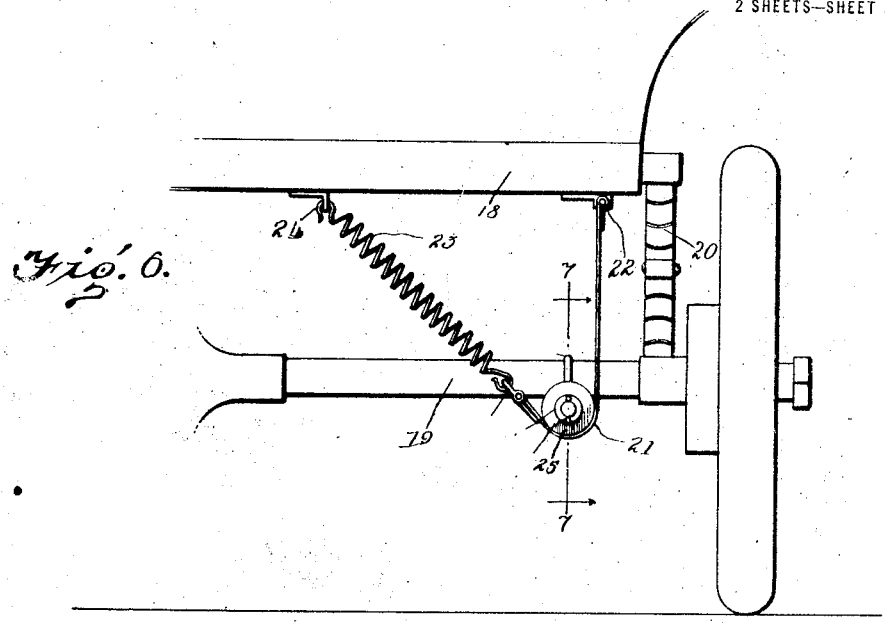
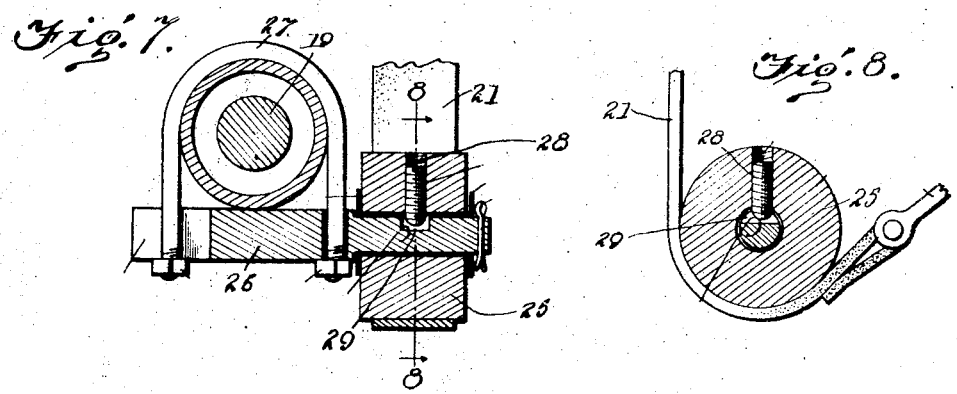
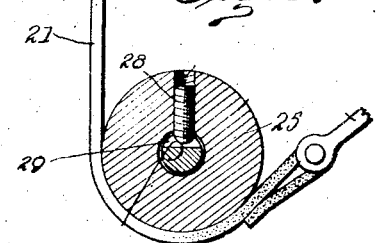
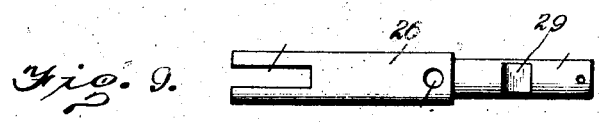

UNITED STATES PATENT OFFICE.

GEORGE B. REID, OF SEATTLE, WASHINGTON.

SHOCK-ABSORBER.

1,326,288.  Specification of Letters Patent.  Patented Dec. 30, 1919.

Application filed January 6, 1919. Serial No. 269,932.

*To all whom it may concern:*

Be it known that I, GEORGE B. REID, a citizen of the United States, and a resident of Seattle, in the county of King and State of Washington, have invented new and useful Improvements in Shock-Absorbers, of which the following is a specification.

My invention is an improvement in shock absorbers, and has for its object to provide a device of the character specified, especially adapted for cushioning the rebound of vehicle bodies under re-action of the springs, wherein a cheap, simple but efficient construction is provided.

In the drawings:—

Figure 1 is a partial rear view of a motor vehicle having the improved absorber, Fig. 2 is an enlarged detail of the absorber, Fig. 3 is a section on the line 3—3 of Fig. 2 looking in the direction of the arrows adjacent the line, Fig. 4 is a top plan view of the rotating arm, Fig. 5 is a perspective view of the anchor, Fig. 6 is a partial rear view showing a modified construction, Fig. 7 is a section on the line 7—7 of Fig. 6, Fig. 8 is a section on the line 8—8 of Fig. 7, both views looking in the direction of the arrows adjacent the respective lines, and Fig. 9 is a perspective view of the supporting shaft.

The embodiment of the invention shown in Figs. 1 to 5 inclusive is shown in connection with a motor vehicle, being arranged between the axle 1 and the body 2, the body being connected to the axle housing by the usual springs 3. The improved absorber comprises a casing 4 of substantially cylindrical form, which is mounted upon the portion 5 of a shaft 6, which is detachably connected to the housing by means of the substantially U-shaped clip 7.

This casing 4 is a wheel or pulley, and a strap 8 of flexible material, as for instance, leather coöperates with the peripheral surface of the casing under conditions to be presently described. This strap has one end connected to a pin 9 on the body 2, and the other end is connected to a pin 10 extending laterally from an arm 11 which is mounted to rotate on a reduced rounded portion 12 of the shaft 6, it being understood that the shaft 6 and the reduced portion 5 are polygonal in cross section, being square in the present instance.

This arm 11 is held in place by a nut and washer 13, and the arm has a second pin 14 which extends into the open end of the casing 4, and engages one end of a spring 15 whose other end is connected to a pin 16 on an anchor plate 17 of rectangular form, and having a rectangular opening for receiving the reduced portion 5 of the shaft 6.

In operation, the parts under normal conditions occupy the position shown in Fig. 1, i. e., the arm 11 extends radially from the shaft at about the horizontal position and the strap 8 is taut and under tension, and does not contact with any portion of the peripheral surface of the casing 4.

It will be understood that a shock absorber is provided at each corner of the vehicle, and when any or all of the body moves downward with respect to the frame or axles, the tension of the springs will rotate the arms 11 moving the said arms as indicated in dotted lines in Fig. 2, to bring the strap into contact and into engagement with the periphery of the casing. When now the body moves upward, there is considerable tension between the casing which is fixed and the strap, and the upward movement of the body is cushioned by this friction.

The embodiment of the invention of Figs. 6 to 9 inclusive, is shown in connection with a motor vehicle, being arranged between the body 18 and the axle 19, the body being connected to the axle housing by the usual springs 20. A strap 21 of flexible material, as, for instance, leather or the like, has one end connected to the body as indicated at 22, the opposite end of the strap being connected to a coil spring 23 connected at its opposite end with the body as indicated at 24.

Intermediate its ends the belt passes over a roller or pulley 25, journaled on the reduced end of the spindle 26 which is connected to the axle housing by a substantially U-shaped clip 27. The roller has a radial opening into which is threaded a screw 28 and the inner end of the screw which is rounded as shown, engages within a notch 29 in the reduced portion of the shaft 26.

In operation with the parts connected as shown in Fig. 6 and with the spring 23 under tension, it will be obvious that when the springs 20 are depressed, the spring 23 will take up the slack in the flexible connection 21—23. As the body moves upward under the re-coil, the strap 21 is drawn from the roller, putting the spring 23 under greater tension, and the said springs thus cushion the movement of the recoil, absorbing the shock which would otherwise be imparted to the body. The pulley has a very slight angular movement on the spindle.

I claim:—

1. In a vehicle, the combination with the body, the axle and the springs connecting the body and the axle of a roller fixed rigidly on the axle, a radial arm journaled to rotate at the axis of the casing, a flexible connection between the body and the arm, and a spring arranged between the casing and the arm and under tension when the body is in normal position to swing the arm when the body is depressed to bring the flexible member into contact with the periphery of the casing, said arm standing with the body in normal position with the flexible member out of contact with the casing.

2. In a vehicle, the combination with the body and the axle, of a fixed pulley on one of said elements, a flexible connection connected with the other of said elements, normally acting spring controlled means for drawing the flexible member about the peripheral surface of the pulley and restrained from action by the normal position of the parts.

GEORGE B. REID.